United States Patent
Hammerschmidt

(10) Patent No.: US 11,055,423 B2
(45) Date of Patent: Jul. 6, 2021

(54) SIGNAL PATTERN CHECKSUM

(71) Applicant: Infineon Technologies AG, Neubiberg (DE)

(72) Inventor: Dirk Hammerschmidt, Finkerstein (AT)

(73) Assignee: Infineon Technologies AG, Neubiberg (DE)

( * ) Notice: Subject to any disclaimer, the term of this patent is extended or adjusted under 35 U.S.C. 154(b) by 557 days.

(21) Appl. No.: 15/941,930

(22) Filed: Mar. 30, 2018

(65) Prior Publication Data

US 2019/0303592 A1 Oct. 3, 2019

(51) Int. Cl.
| | |
|---|---|
| G06F 21/60 | (2013.01) |
| H03M 13/00 | (2006.01) |
| H03M 13/09 | (2006.01) |
| G06F 21/64 | (2013.01) |

(52) U.S. Cl.
CPC ............ *G06F 21/606* (2013.01); *G06F 21/64* (2013.01); *H03M 13/09* (2013.01); *H03M 13/617* (2013.01)

(58) Field of Classification Search
CPC ........ G06F 21/60; G06F 21/606; G06F 21/64; H03M 13/09; H03M 13/617; H04L 67/02; H04L 67/025; H04L 67/04; H04L 67/12; H04L 67/125; H04L 67/42; H04L 25/40; H04L 25/49; H04L 25/4902; H04L 1/00; H04L 1/0056; H04L 1/0057; H04L 1/0058; H04L 1/0061; H04L 1/0063; H04L 1/007; H04L 1/0072
See application file for complete search history.

(56) References Cited

U.S. PATENT DOCUMENTS

| | | | | |
|---|---|---|---|---|
| 2013/0272368 | A1* | 10/2013 | Yang | H04B 14/026 375/238 |
| 2014/0214970 | A1* | 7/2014 | Rasbornig | H04L 1/22 709/206 |
| 2015/0269019 | A1* | 9/2015 | Scherr | H04L 1/0061 714/807 |
| 2016/0277149 | A1* | 9/2016 | Hammerschmidt | H04L 67/12 |
| 2018/0173665 | A1* | 6/2018 | Mishra | G06F 13/4282 |
| 2018/0292513 | A1* | 10/2018 | Bidner | G01S 17/58 |

OTHER PUBLICATIONS

Josej Kramolis, MPC574xP SENT/SPC Driver, 2014, Freescale Semiconductor, Application Note, pp. 1-38 (Year: 2014).*
Unknown Author, TLE4998C3 TLE4998C4 Programmable Linear Hall Sensor, 2008, Infineon Techonologies AG, Data Sheet Rev 1.0, pp. 1-43 (Year: 2008).*

* cited by examiner

*Primary Examiner* — Robert B Leung
*Assistant Examiner* — Adrian Stoica
(74) *Attorney, Agent, or Firm* — Schiff Hardin LLP

(57) ABSTRACT

A signal processor including a Pulse Width Modulation (PWM) encoder configured to encode data into a data PWM pattern; and a block encoder coupled to the PWM encoder, and configured to determine a checksum of the data PWM pattern, wherein the PWM encoder is further configured to encode the checksum into a checksum PWM pattern, and append the checksum PWM pattern on the data PWM pattern for transmission as a PWM signal.

20 Claims, 5 Drawing Sheets

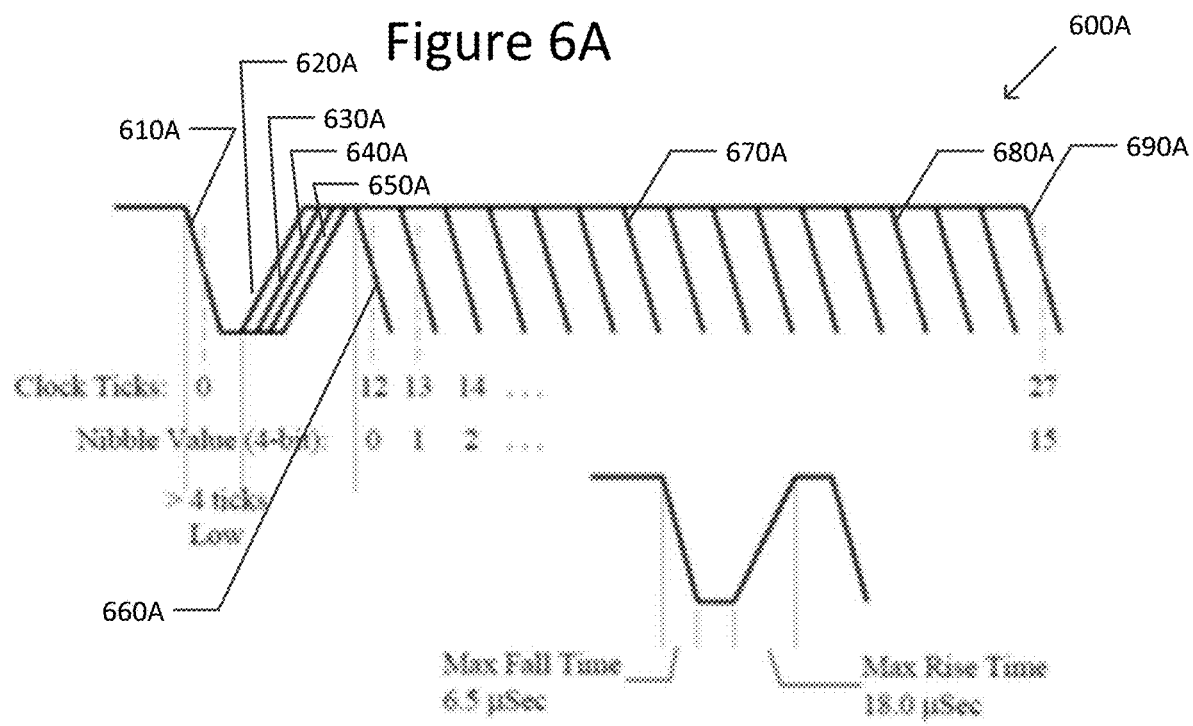
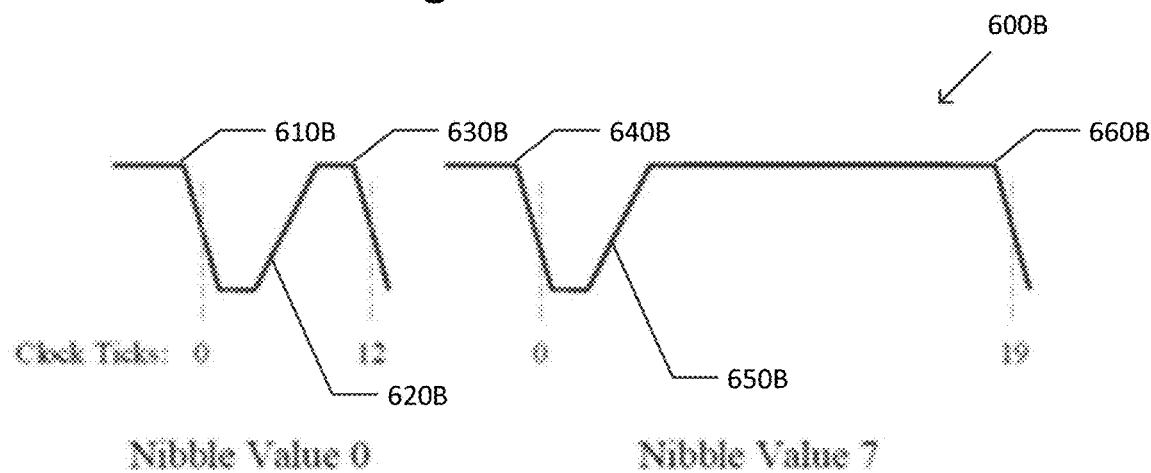

SIGNAL PATTERN CHECKSUM

TECHNICAL FIELD

The present disclosure generally relates to signal transmission data protection.

BACKGROUND

Short PWM Code (SPC) and Single Edge Nibble Transmission (SENT) protocols use Pulse Width Modulation (PWM) encoding for transmission of a message 4-bit nibbles. A checksum is attached to the message for protection. The checksum is usually a 4-bit Cyclic Redundancy Code (CRC).

Cyclic redundancy checking is a method of checking for errors in data that has been transmitted on a communications link. A transmitter applies a polynomial to a block of data that is to be transmitted and appends the resulting CRC. The receiver applies the same polynomial to the data and compares its result with the result appended by the transmitter. If the CRCs are the same, the data has been received successfully.

The coverage rate of the cyclic redundancy checking is dependent on the length of the CRC and the length of the message. In many sensor protocols, a number of available bits is low, and therefore the CRCs are often short. A short CRC, such as a 3-bit or 4-bit CRC, does not protect as well as longer CRCs, such as 32-bit or 64-bit CRCs used in internet communication protocols. What is needed is data protection that, with a limited number of bits available for the CRC, provides as much protection as possible.

BRIEF DESCRIPTION OF THE DRAWINGS

FIG. 6A illustrates a timing diagram of a transmission of a 4-bit nibble in accordance with a Single Edge Nibble Transmission (SENT) protocol.

FIG. 6B illustrates example SENT protocol PWM encoding for nibble value 0 and nibble value 7.

DESCRIPTION OF THE ASPECTS

The present disclosure is directed to signal transmission data protection that comprises applying a block code, such as a Cyclic Redundancy Code (CRC), to a sequence of Pulse Width Modulation (PWM) nibble ticks instead of data.

Figure 1:
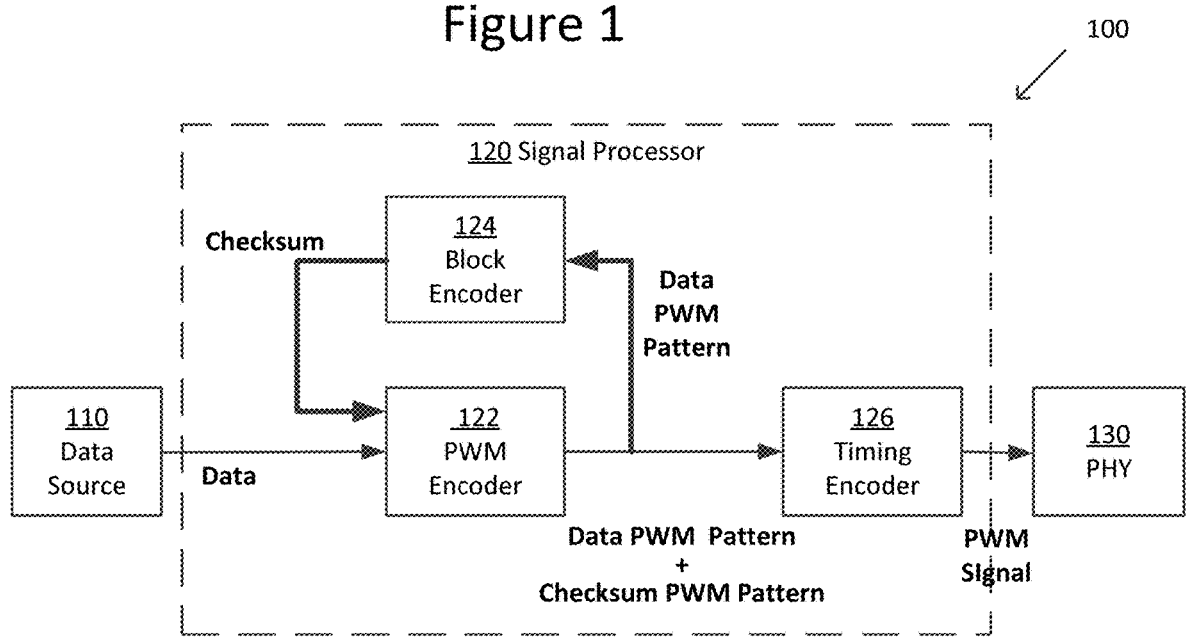
FIG. 1 illustrates a schematic diagram of a signal transmission system in accordance with an aspect of the disclosure.

FIG. 1 illustrates a schematic diagram of a signal transmission system 100 in accordance with an aspect of the disclosure.

By way of overview, the signal transmission system 100 is configured to encode data into a data PWM pattern and then determining a checksum of the data PWM pattern. Subsequently, the checksum is encoded into a checksum PWM pattern, and appended onto the data PWM pattern. The resulting PWM pattern is then timing encoded and transmitted as a PWM signal over a physical medium in a same manner as conventional systems.

The signal transmission system 100 comprises a data source 110, a signal processor 120, and a physical medium 130. The data source 110 may be a sensor, such as a pressure sensor, an accelerometer, an angle sensor, a position sensor, or the like, though the disclosure is not limited in this respect. The physical medium 130 may be any wireless or wireline transmission medium.

The signal processor 120 comprises a Pulse Width Modulation (PWM) encoder 122, a block encoder 124, and a timing encoder 126.

The PWM encoder 122 is configured to encode data into a data PWM pattern.

The block encoder 124 is coupled to the PWM encoder 124, and is configured to determine a checksum of the data PWM pattern. The block encoder 124 may be any type of block encoder that is configured to determine a checksum, such as a Cyclic Redundancy Check (CRC) code, a parity code, a Hamming code, a turbo code, and a Low Density Parity Check (LDPC) code, or any other block code.

The PWM encoder 122 is further configured to encode the checksum from the block encoder 124 into a checksum PWM pattern, and append the checksum PWM pattern on the data PWM pattern for transmission as a PWM signal. The PWM encoder 122 is further configured to each of encode the data into the data PWM pattern, encode the checksum into the checksum PWM pattern, and append the checksum PWM pattern on the data PWM pattern, in accordance with a Single Edge Nibble Transmission (SENT) protocol. As is known, the SENT protocol is a point-to-point scheme for transmitting signal values from a sensor to a controller. The SENT protocol is described below with reference to FIGS. 3A and 3B.

The timing encoder 126 is coupled to the PWM encoder 122, and is configured to generate the PWM signal from the data PWM pattern and the appended checksum PWM pattern. The signal processor 120 is then configured to transmit via the physical medium 130 each of the encoded data PWM pattern and the appended checksum PWM pattern as the PWM signal in accordance with a Short PWM Code (SPC) protocol. The SPC protocol is described below with reference to FIG. 3C.

Figure 2:
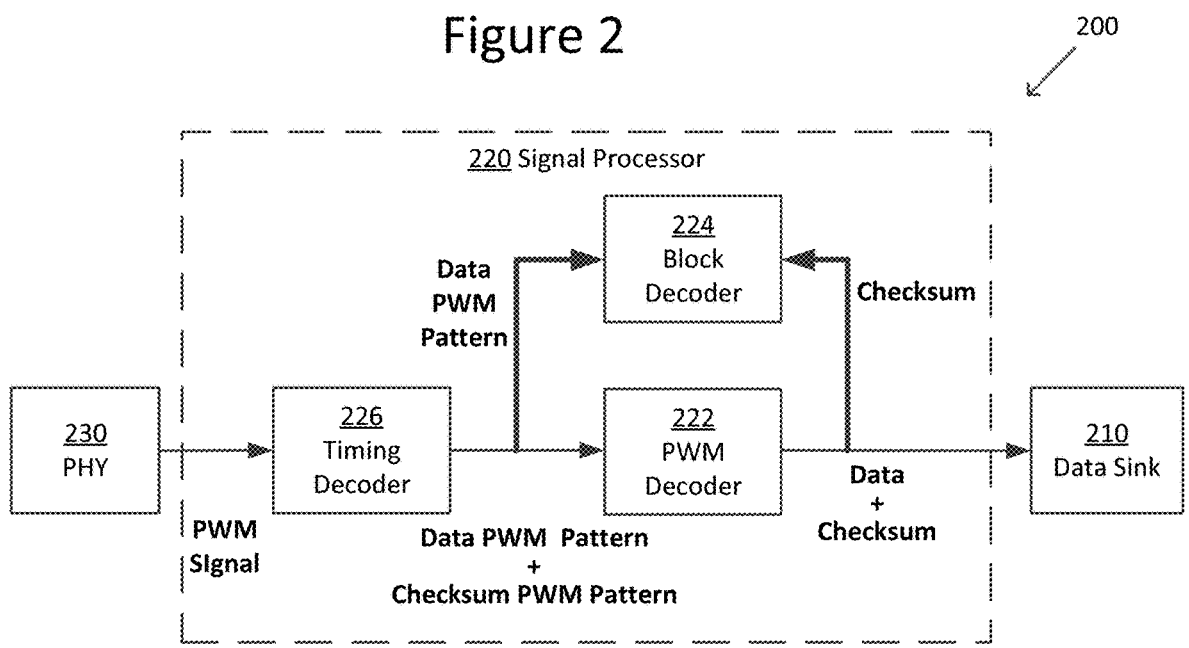
FIG. 2 illustrates a schematic diagram of a signal reception system in accordance with an aspect of the disclosure.

FIG. 2 illustrates a schematic diagram of a signal reception system 200 in accordance with an aspect of the disclosure.

By way of overview, the signal reception system 200 is configured to decode a received PWM signal into a PWM pattern of data and checksum based on a tick time extracted from a sync pulse in a same manner as in a conventional reception system. However, the data PWM pattern is transmitted directly to a block decoder, while the checksum pattern is decoded into a checksum and transmitted to the block decoder for an error check.

The signal reception system 200 comprises a physical medium 230, a signal processor 220, and a data sink 210. The signal reception system may be a controller. The physical medium 230 may be the same as the physical medium 130 of FIG. 1. The data sink 210, which is an Electronic Control Unit (ECU) or controller that uses the transmitted data The signal processor comprises a timing decoder 226, a PWM decoder, and a block decoder 224.

The timing decoder 226 is configured to decode a PWM signal into a data PWM pattern and a checksum PWM pattern.

The PWM decoder 222 is configured to decode the data PWM pattern into data, and the checksum PWM pattern into a checksum. The PWM decoder 222 is also configured to decode each of the data PWM pattern and the checksum PWM pattern in accordance with a Single Edge Nibble Transmission (SENT) protocol.

The block decoder 224 is configured to detect any errors in the PWM signal based on the data PWM pattern and the checksum. The block decoder 224 may be any type of block decoder that is configured to determine decode based on a CRC code, a checksum, such as a parity code, a Hamming code, a turbo code, and a Low Density Parity Check (LDPC) code, or any other block code.

The signal processor 220 is configured to receive each of the encoded data PWM pattern and the appended checksum PWM pattern of the PWM signal in accordance with a Short PWM Code (SPC) protocol.

Figure 3:
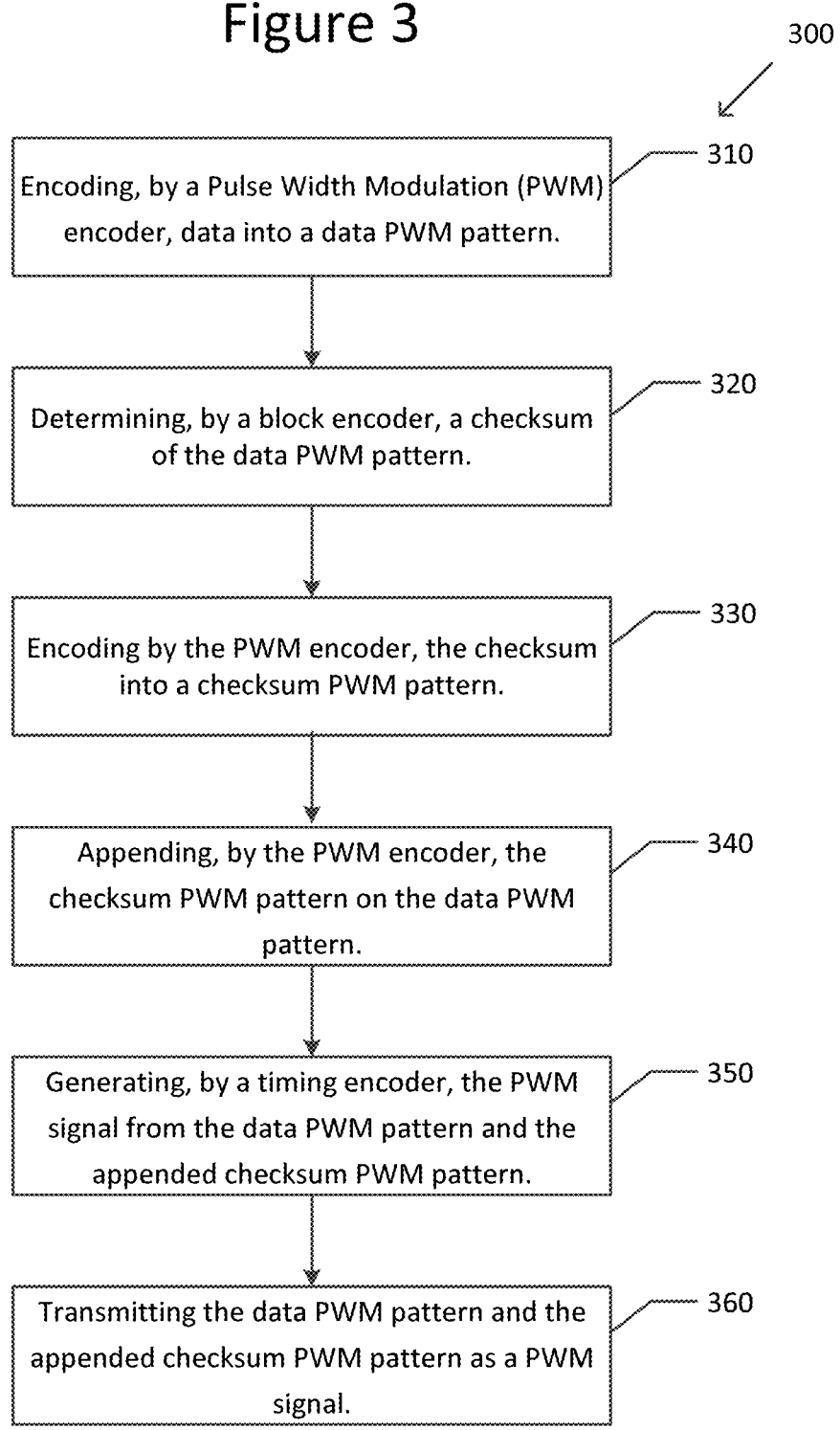
FIG. 3 illustrates a flowchart of a signal transmission method in accordance with an aspect of the disclosure.

FIG. 3 illustrates a flowchart of a signal transmission method 300A in accordance with an aspect of the disclosure.

At 310, the PWM encoder 122 encodes data into a data PWM pattern. As discussed above, the PWM encoder 122 may encode the data into the data PWM pattern in accordance with the SENT protocol.

At 320, the block encoder 124 determines a checksum of the data PWM pattern. As discussed above, the block encoding may be Cyclic Redundancy Check (CRC) encoding or any other types of block encoding as discussed above.

At 330, the PWM encoder 122 encodes the checksum into a checksum PWM pattern. As discussed above, the PWM encoder 122 may encode the checksum into the checksum PWM pattern in accordance with the SENT protocol.

At 340, the PWM encoder 122 appends the checksum PWM pattern on the data PWM pattern.

At 350, the timing encoder 126 generates the PWM signal from the data PWM pattern and the appended checksum PWM pattern.

At 360, the signal processor 120 transmits the data PWM pattern and the appended checksum PWM pattern as a PWM signal.

Figure 4:
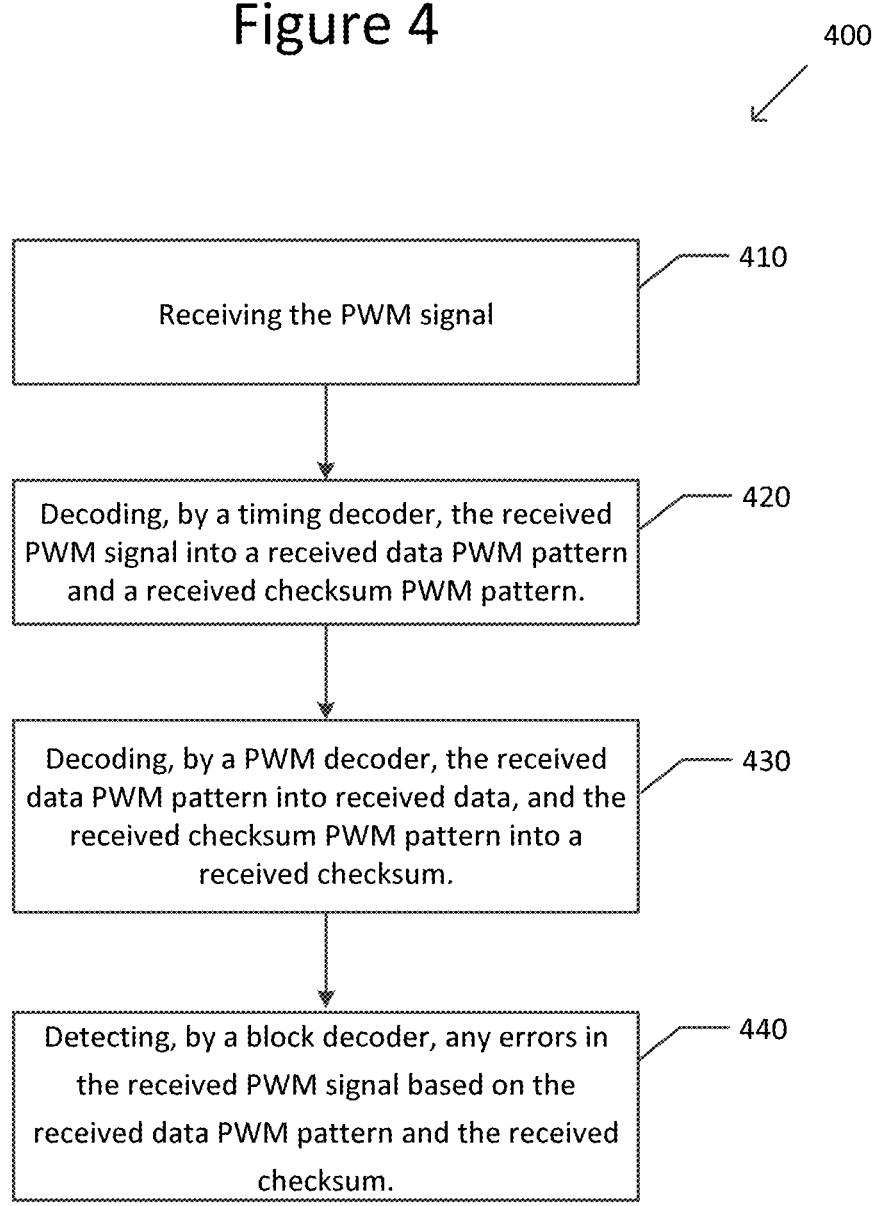
FIG. 4 illustrates a flowchart of a signal reception method in accordance with an aspect of the disclosure.

FIG. 4 illustrates a flowchart of a signal reception method 400 in accordance with an aspect of the disclosure.

At 410, the signal processor 220 receives, via the physical medium 230, the PWM signal. As discussed above, the PWM signal may be received in accordance with a Short PWM Code (SPC) protocol.

At 420, the timing decoder 226 decodes the received PWM signal into a received data PWM pattern and a received checksum PWM pattern. This decoding may be performed in accordance with the SENT protocol.

At 430, the PWM decoder 222 decodes the received data PWM pattern into received data, and the received checksum PWM pattern into a received checksum. This decoding may be performed in accordance with the SENT protocol.

At 440, the block decoder 224 detects any errors in the received PWM signal based on the received data PWM pattern and the received checksum. As discussed above, the block decoder 224 may be any type of block decoder that is configured to determine decode based on a CRC code, a checksum, such as a parity code, a Hamming code, a turbo code, and a Low Density Parity Check (LDPC) code, or any other block code.

Figure 5:
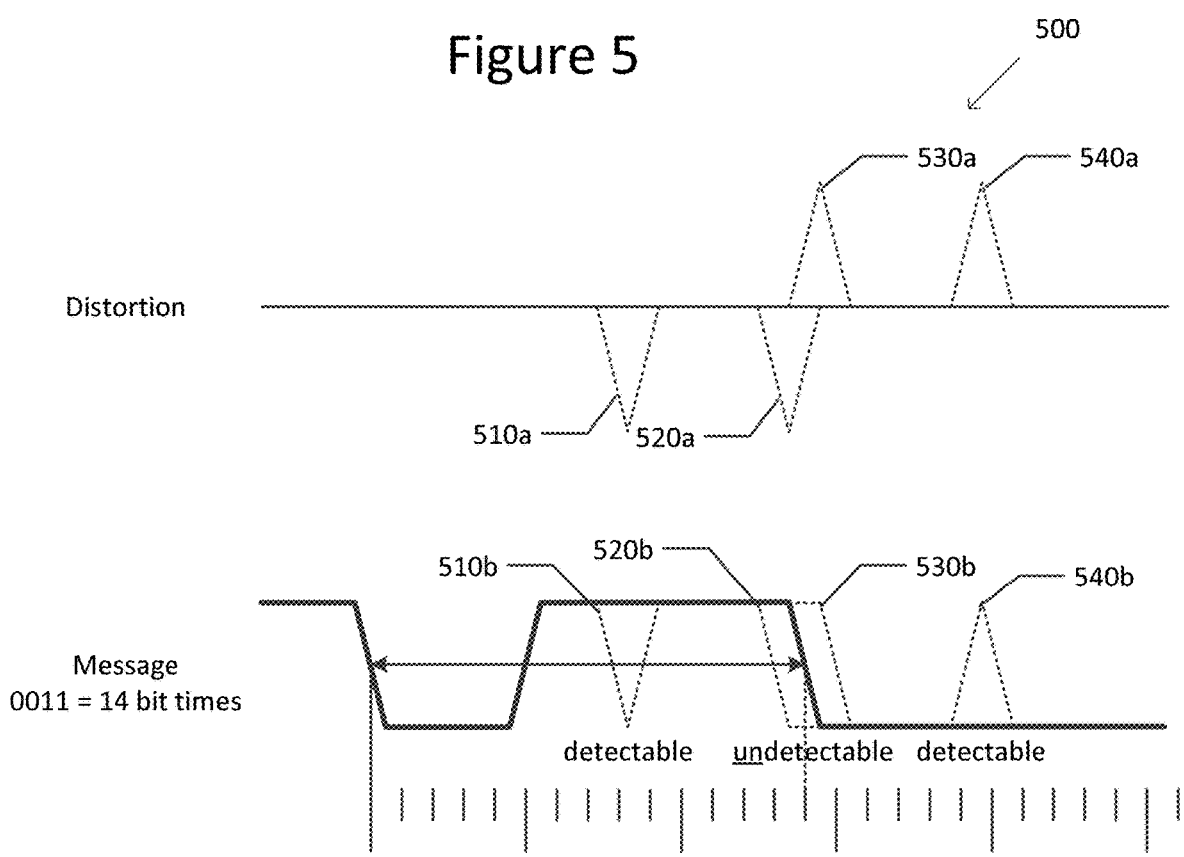
FIG. 5 illustrates a timing diagram of distortions that may impact a PWM nibble transmission.

FIG. 5 illustrates a timing diagram 500 of distortions that may impact a PWM nibble transmission.

A faulty signal results from distortion (e.g., noise or Electro-Magnetic Interference (EMI)) of an original PWM nibble transmission. When the distortion is shorter than the shortest time periods that are specified by the protocol timing, the distortion can be detected as long as the distortion does not appear in proximity of the a nibble pulse edge. However, if the distortion occurs near a nibble pulse edge, the distortion can cause a pull in or delay of the edge.

In the example illustrated in FIG. 5, the message is PWM encoding of a nibble value 2. The nibble pulse length is 14 clock ticks (i.e., 12 clock ticks+2 clock ticks), as explained in detail below with respect to FIGS. 6A-6C. The influence of possible distortion spikes 510-540 at four different times is discussed.

In the first and second examples, the distortion spike 510, 540 does not impact the nibble value. More specifically, in the first example, the spike 510a occurs when the nibble pulse is constantly high 510b and thus easily detectable since it infringes the protocol timing constraints. In the second example, the spike 540a occurs when the nibble pulse is constantly low 540b and thus it is also easily detectable.

In the third and fourth examples, however, the distortion spike 520, 530 does impact the nibble value. These distortion spikes 520a and 530a appear during the fall of the message from high to low. The nibble value may change to be one bit value lower as shown by spike 520b where the falling edge that dictates the nibble value has shifted one clock tick to the left, or one bit value higher as shown by spike 530b where the falling edge that dictates the nibble value has shifted one clock tick to the right. This leads to reception of incorrect messages. For the message affected by spikes 520a or 530a, the actual nibble value, and hence the correct message, is undetectable.

FIG. 6A illustrates a timing diagram 600A of a transmission of a 4-bit nibble in accordance with a Single Edge Nibble Transmission (SENT) protocol.

The minimum nibble pulse width is 12 clock ticks, which represents a nibble value 0, and the maximum nibble pulse width is 27 clock ticks, which represents a nibble value 15. Each nibble count is 1 clock tick. The nibble pulse has more than 4 clock ticks driven low time and all the remaining clock ticks driven high based on the nibble to be transmitted.

The falling-edge 610A is the beginning of the nibble pulse. Since more than 4 clock ticks are driven low and all the remaining clock ticks are driven high, any one of the rising edges 620A-650A may be used for addressing an individual sensor transmitting a nibble. Alternatively or additionally, a rising edge 620A-650A may indicate an individual mode of a sensor transmitting nibbles. Such modes may comprise different sensitivity modes of the sensor, a calibration mode, or the like, but is not limited thereto. The pulse is then driven low based on the nibble to be transmitted. For example, to transmit a nibble of value 0, the falling-edge occurs at the 12th clock tick 660A (12+0 clock ticks) from the beginning of the nibble pulse. Similarly, to transmit nibbles with values 6, 12 and 15, the falling-edges occur at the 18th clock tick 670A (12+6 clock ticks), 24th clock tick 680A (12+12 clock ticks), and 27th clock tick 690A (12+15 clock ticks), respectively.

FIG. 6B illustrates example SENT protocol PWM encoding for nibble value 0 (on the left-hand side of the figure) and nibble value 7 (on the right-hand side of the figure).

The total clock tick count (falling-edge 610B to falling-edge 630B) for transmitting the nibble value 0 is 12 (12+0 clock ticks). That is, the nibble pulse begins with the falling-edge 610B and is driven low for more than 4 clock ticks. The nibble pulse is then driven high, which is represented by the rising-edge 620B. The pulse remains high until reaching the desired nibble value to be transmitted, which in accordance with this example is 0. Therefore, the falling-edge 630B occurs at the 12th clock tick from the beginning of the pulse, thus representing the end of the pulse.

Similarly, the total clock tick count (falling-edge 640B to falling-edge 660B) for transmitting the nibble value 7 is 19 (i.e., 12+7 clock ticks). That is, the nibble pulse begins with the falling-edge 640B and is driven low for more than 4 clock ticks. The nibble pulse is then driven high, which is represented by the rising-edge 650B. The pulse remains high until reaching reaches the desired nibble value to be transmitted, which in accordance with this example is 7. Therefore, the falling-edge 630B occurs at the 19th clock tick from the beginning of the pulse, thus representing the end of the pulse. One clock tick is assigned to each nibble value. A 4-bit nibble thus takes values from 0-15. Therefore, a PWM encoded nibble pulse may take 12-27 clock ticks.

Figure 6C:
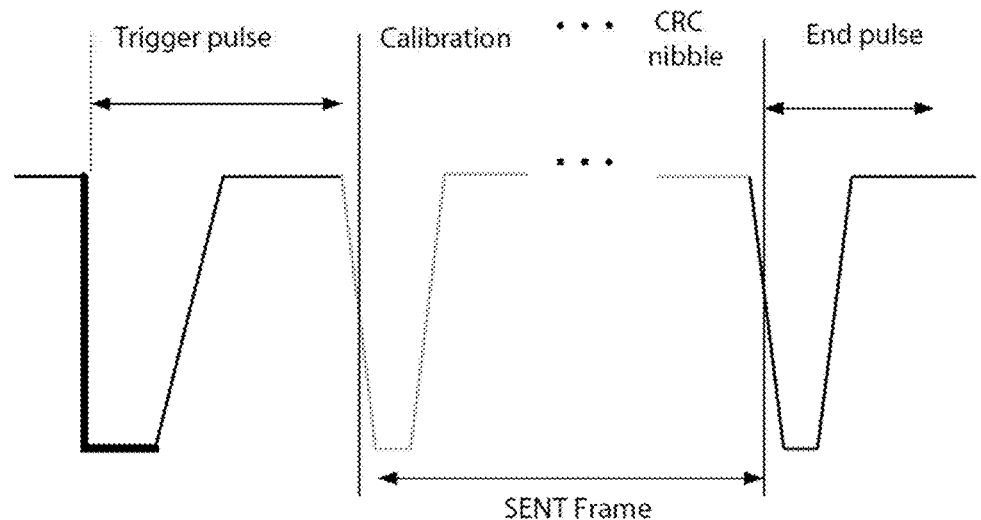
FIG. 6C illustrates a timing diagram of a Short PWM Code (SPC) protocol extending the SENT protocol.

FIG. 6C illustrates a timing diagram 600C of a Short PWM Code (SPC) protocol extending the SENT protocol.

The SPC protocol is mostly compatible with the SENT protocol. The frame definition is based on a SENT frame, but is preceded by a trigger pulse and followed by an end pulse.

An SPC transmission is initiated by a trigger pulse. An SPC master generates a falling edge of the trigger pulse. The master holds the signal at a low level during a defined time, and releases the line to let a slave drive. The trigger pulse has a defined length, which depends on the operating mode of the SPC link. At the end of the trigger pulse, the slave starts sending a SENT frame, which includes a calibration pulse to allow the master to determine accurately the internal unit time of the slave. In order for the CRC nibble to be properly decoded, it is necessary to add an additional end pulse at the end of the frame. This end pulse is only here to provide a falling edge so that the CRC nibble duration can be measured.

Two examples (data content 0 and data content 9) for SENT-SPC nibble encoding is described in the following paragraphs.

In the first example with data content 0, a data nibble D=0000 in binary (i.e., 0 in decimal) is encoded by the PWM encoder 122 into a PWM pattern P=0000 11111111 (4×0+8×1+0×1) before transmission to the block encoder 124. More specifically, the first portion "0000 11111111" (4×0+8×1) of the PWM pattern is the standard starting pulse, and then the data portion follows. Since in this example the data is 0, to the initial standard starting pulse no 1s are added (0×1). The PWM pattern is thus P=0000 11111111 (4×0+8×1+0×1).

In the second example with data content 9, a data nibble D=1010 in binary (i.e., 9 in decimal) is encoded by the PWM encoder 122 into a PWM pattern P=0000 11111111 111111111 (4×0+8×1+9×1) before transmission to the block encoder 124. More specifically, the first portion "0000 11111111" (4×0+8×1) of the PWM pattern is the standard starting pulse, and then the data portion follows. Since in this example the data is 9, to the initial standard starting pulse, nine 1s are added (9×1). So instead of a 1010 binary signal being transmitted, a PWM pattern P signal, which extends the length of the high pulse of the signal, is transmitted. Each increase of the value of the data results in an increase the length of the high pulse by one time unit. The PWM pattern is thus P=0000 11111111 111111111 (4×0+8×1+9×1).

The pattern length varying based on the data content does not impact block protection performance. A variant encoding system that fills the data pattern with zeros up to the maximum frame length is alternatively possible.

The aspects of the disclosure described herein are an improvement of the frame error detection of the SENT-SPC standard 4-bit CRC. The aspects use an inherent property of the CRC to guarantee a detection of burst errors (i.e., errors that affect adjacent bits) up to the length of the CRC. In case of a PWM signal, this means that any change of the pulse length by the length of the CRC in either direction is detectable. For the 4 bit CRC according to the SENT specification this means any transmission fault within +/−4 time units are detectable. From a Hamming Distance (HD) of 2 with guaranteed 1-bit error detection in the case of a conventional protection scheme for SPC frames, to 5 Least Significant Bit (LSB) detection of a changed pulse length, which is an HD equivalent between 3 and 4 due to a combination of PWM data encoding properties and CRC burst error detection capabilities.

The disclosure describes encoding and decoding in a context of SENT or SPC protocols. However, the disclosure is not limited in this respect. The disclosure is applicable to any PWM encoding or decoding.

The disclosure describes encoding and decoding in a context of CRC protocols. However, the disclosure is not limited in this respect. The disclosure is applicable to any other type of redundancy encoding or decoding scheme, such as Hamming codes, Turbo codes or LDPC.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A hardware signal processor, comprising:
a Pulse Width Modulation (PWM) encoder configured to encode data into a data PWM pattern; and
a block encoder coupled to the PWM encoder, and configured to determine a checksum computed over the data PWM pattern,
wherein the PWM encoder is further configured to encode the checksum into a checksum PWM pattern, and append the checksum PWM pattern on the data PWM pattern for transmission as a PWM signal.

2. The hardware signal processor of claim 1, wherein the block encoder is a Cyclic Redundancy Check (CRC) encoder.

3. The hardware signal processor of claim 1, wherein the checksum is selected from a group of checksums consisting of a parity code, a Hamming code, a turbo code, and a Low Density Parity Check (LDPC) code.

4. The hardware signal processor of claim 1, further comprising:
a timing encoder coupled to the PWM encoder, and configured to generate the PWM signal from the data PWM pattern and the appended checksum PWM pattern.

5. The hardware signal processor of claim 1, wherein the PWM encoder is configured to each of encode the data into the data PWM pattern, encode the checksum into the checksum PWM pattern, and append the checksum PWM pattern on the data PWM pattern, in accordance with a Single Edge Nibble Transmission (SENT) protocol.

6. The hardware signal processor of claim 1, wherein the hardware signal processor is configured to transmit each of the encoded data PWM pattern and the appended checksum PWM pattern as the PWM signal in accordance with a Short PWM Code (SPC) protocol.

7. A sensor, comprising:
the hardware signal processor of claim 1.

8. The sensor of claim 7, wherein the sensor is selected from a group of sensors consisting of a pressure sensor, an accelerometer, an angle sensor, and a position sensor.

9. A hardware signal processor, comprising:
a timing decoder configured to decode a PWM signal into a data PWM pattern and a checksum PWM pattern, wherein the checksum PWM pattern was computed over the data PWM pattern;
a Pulse Width Modulation (PWM) decoder configured to decode the data PWM pattern into data, and the checksum PWM pattern into a checksum; and
a block decoder configured to detect any errors in the PWM signal based on the data PWM pattern and the checksum.

10. The hardware signal processor of claim 9, wherein the block decoder is a Cyclic Redundancy Check (CRC) decoder.

11. The hardware signal processor of claim 9, wherein the checksum is selected from a group of checksums consisting of a parity code, a Hamming code, a turbo code, or a Low Density Parity Check (LDPC) code.

12. The hardware signal processor of claim 9, wherein the PWM decoder is configured to decode each of the data PWM pattern and the checksum PWM pattern in accordance with a Single Edge Nibble Transmission (SENT) protocol.

13. The hardware signal processor of claim 9, wherein the hardware signal processor is configured to receive each of the encoded data PWM pattern and the appended checksum PWM pattern of the PWM signal in accordance with a Short PWM Code (SPC) protocol.

14. A controller, comprising:
the hardware signal processor of claim 9.

15. A signal processing method, comprising:
encoding, by a Pulse Width Modulation (PWM) encoder, data into a data PWM pattern;
determining, by a block encoder coupled to the PWM encoder, a checksum computed over the data PWM pattern;
encoding by the PWM encoder, the checksum into a checksum PWM pattern;
appending, by the PWM encoder, the checksum PWM pattern on the data PWM pattern; and
transmitting the data PWM pattern and the appended checksum PWM pattern as a PWM signal.

16. The signal processing method of claim 15, wherein the block encoding is Cyclic Redundancy Check (CRC) encoding.

17. The signal processing method of claim 15, further comprising:
generating, by a timing encoder coupled to the PWM encoder, the PWM signal from the data PWM pattern and the appended checksum PWM pattern.

18. The signal processing method of claim 15, wherein the encoding the data into the data PWM pattern and the checksum into the checksum PWM pattern is in accordance with a Single Edge Nibble Transmission (SENT) protocol.

19. The signal processing method of claim 15, further comprising:
receiving the PWM signal;
decoding, by a timing decoder, the received PWM signal into a received data PWM pattern and a received checksum PWM pattern;
decoding, by a PWM decoder, the received data PWM pattern into received data, and the received checksum PWM pattern into a received checksum; and
detecting, by a block decoder, any errors in the received PWM signal based on the received data PWM pattern and the received checksum.

20. The method of claim 19,
wherein the decoding the received data PWM pattern into the received data and the received checksum PWM pattern into the received checksum is in accordance with a Single Edge Nibble Transmission (SENT) protocol, and
wherein the PWM signal is received in accordance with a Short PWM Code (SPC) protocol.

* * * * *